UNITED STATES PATENT OFFICE.

EZECHIEL WEINTRAUB, OF SCHENECTADY, NEW YORK, ASSIGNOR TO GENERAL ELECTRIC COMPANY, A CORPORATION OF NEW YORK.

SUSPENSION OF CARBON IN ALKALI METALS AND PROCESS OF MAKING SAME.

No. 922,645.  Specification of Letters Patent.  Patented May 25, 1909.

Application filed November 23, 1904. Serial No. 233,985.

*To all whom it may concern:*

Be it known that I, EZECHIEL WEINTRAUB, a subject of the Czar of Russia, residing at Schenectady, in the county of Schenectady and State of New York, have invented certain new and useful Improvements in Compositions of Matter and Methods of Making the Same, of which the following is a specification.

The element carbon has long been considered insoluble except in relatively minute quantities such as may be found existing in high carbon steel or the like. I have discovered, however, that carbon, preferably in the form of graphite, may at ordinary temperatures, such as atmospheric temperatures, be dissolved in large quantities in the metal potassium. I am of the opinion that the potassium absorbs the carbon and causes it to diffuse throughout the mass and that the carbon is held in this position or condition by mutual attraction between the carbon and the potassium, and not by reason of the formation of a chemical compound. I consider it difficult, if not impossible, to demonstrate absolutely that the attraction between the carbon and the potassium is a molecular or atomic attraction, but I have hereinafter described my invention in such detail that the product can be readily made by persons skilled in the art by following the simple steps of the process set forth.

My improved product has some properties common to solutions or molecular suspension, but the invention may be successfully practiced without determining whether the product is a molecular suspension, a colloidal suspension, or some other form of suspension, and although I have hereinafter used the word suspension I do not desire to be limited by any particular theory. In order to effect this suspension of carbon, I may perform the operation with the materials in a vacuum or in some inert gas. The potassium may be melted in order the more readily to make good mechanical contact with the carbon and thus draw the same into itself. The most convenient means of effecting the result, however, is to mix with the potassium a small percentage, say 5 per cent. of sodium. Although potassium and sodium are solids at ordinary temperatures, the effect of the mixture or alloying of the two elements is to produce a fluid which in appearance closely resembles mercury. Into this fluid the graphite may be inserted and thereby quickly dissolved or absorbed. When the potassium-sodium alloy is used, the absorption and diffusion take place at ordinary temperatures without the application of external heat. No chemical change takes place in the graphite, other than the change of form necessitated by its passing into the state of suspension. By treating the suspension with alcohol, water, mercury or other substance capable of dissolving or otherwise removing the alkali metal, the graphite comes out as a finely divided powder. In this form the carbon is more sensitive to chemical reactions than when otherwise powdered. The suspension may be used for a variety of other purposes. Thus for example by passing atmospheric nitrogen through the heated suspension, I may form potassium cyanid.

It is not always necessary that the solid potassium be in contact with the carbon to produce the suspension, since the vapor of potassium is effective for this purpose. Thus an ordinary flashed-carbon filament of an incandescent lamp when exposed to the vapors of say the sodium-potassium alloy above mentioned is superficially soluble and changes in appearance to a bronze color. Upon driving off the potassium the surface of the filament is found to have undergone a change beneficial to the function of the filament as an incandescing element.

Various other uses for the suspension will suggest themselves to chemists. The suspension of carbon which I have discovered thus may constitute an intermediate step in a large variety of chemical processes.

What I claim as new and desire to secure by Letters Patent of the United States, is,

1. A suspension of carbon in metallic potassium.

2. A liquid consisting of carbon suspended in metal at ordinary temperatures.

3. The method which consists of absorbing and diffusing carbon at ordinary temperatures in a body containing alkali metal.

4. A suspension consisting principally of carbon and potassium.

5. A suspension consisting essentially of carbon and alkali metal.

6. The method which consists in exposing graphite to the action of potassium in the substantial absence of oxygen, thereby producing a carbon suspension.

7. The method which consists in exposing graphite to the action of potassium in the substantial absence of oxygen, thereby producing a carbon suspension and thereafter precipitating out the carbon.

8. A body of alkali metal containing carbon uniformly diffused therethrough and chemically uncombined therewith.

9. The composition of matter consisting substantially of potassium with uncombined carbon uniformly distributed therethrough.

10. The method which consists in absorbing and diffusing carbon in potassium.

In witness whereof, I have hereunto set my hand this nineteenth day of November, 1904.

EZECHIEL WEINTRAUB.

Witnesses:
EDWARD WILLIAMS, Jr.,
BENJAMIN B. HULL.